United States Patent
Halstead et al.

(10) Patent No.: US 11,800,206 B2
(45) Date of Patent: Oct. 24, 2023

(54) HYBRID CAMERAS

(71) Applicant: CALUMINOPTY LTD, Eveleigh (AU)

(72) Inventors: Mark Halstead, Auckland (NZ); Daniel Petrov, Lilyfield (AU); Marek Steffanson, Mosman (AU)

(73) Assignee: Calumino Pty Ltd., Eveleigh (AU)

( * ) Notice: Subject to any disclaimer, the term of this patent is extended or adjusted under 35 U.S.C. 154(b) by 0 days.

(21) Appl. No.: 16/919,722

(22) Filed: Jul. 2, 2020

(65) Prior Publication Data

US 2021/0014396 A1 Jan. 14, 2021

Related U.S. Application Data

(60) Provisional application No. 62/871,660, filed on Jul. 8, 2019.

(51) Int. Cl.
*H04N 23/45* (2023.01)
*H04N 23/54* (2023.01)

(52) U.S. Cl.
CPC .............. *H04N 23/45* (2023.01); *H04N 23/54* (2023.01)

(58) Field of Classification Search
CPC .................... H04N 5/2258; H04N 5/2253
See application file for complete search history.

(56) References Cited

U.S. PATENT DOCUMENTS

| | | | | |
|---|---|---|---|---|
| 10,783,554 B1* | 9/2020 | Hylton | | G06V 20/20 |
| 2001/0031912 A1* | 10/2001 | Adler | | A61B 1/00096 |
| | | | | 600/129 |
| 2002/0136435 A1* | 9/2002 | Prokoski | | G06V 40/166 |
| | | | | 382/118 |
| 2002/0140822 A1* | 10/2002 | Kahn | | H04N 23/60 |
| | | | | 348/207.99 |
| 2003/0035049 A1* | 2/2003 | Dickens | | H04N 5/268 |
| | | | | 348/E5.057 |
| 2003/0037878 A1* | 2/2003 | Kotoku | | G03F 7/70041 |
| | | | | 118/50.1 |
| 2003/0142219 A1* | 7/2003 | McGarvey | | H04N 25/60 |
| | | | | 348/E5.079 |
| 2007/0058142 A1* | 3/2007 | Radominski | | H04N 5/7458 |
| | | | | 348/E5.142 |

(Continued)

FOREIGN PATENT DOCUMENTS

| | | | | |
|---|---|---|---|---|
| CN | 207968682 | | 10/2018 | |
| GB | 2320155 A | * | 6/1998 | G01J 3/453 |

(Continued)

OTHER PUBLICATIONS

International Search Report and Written Opinion, PCT/US2020/041059, dated Oct. 21, 2020.

(Continued)

*Primary Examiner* — Joseph Suh
(74) *Attorney, Agent, or Firm* — Greenberg Traurig

(57) ABSTRACT

Systems combining an optical camera and an infrared camera in a single device having a single output, the systems provide low cost production and a hybrid output having optical and infrared elements processed by a processor embedded in the single device, the output of the single device having a relatively low size image overlay and providing a full video stream having optical and infrared elements as well as a hybrid image having an overlay of the optical and infrared elements.

19 Claims, 9 Drawing Sheets

(56) References Cited

U.S. PATENT DOCUMENTS

| | | | |
|---|---|---|---|
| 2007/0103599 A1* | 5/2007 | Wen-Chin | H04N 21/4122 348/E5.142 |
| 2010/0303068 A1* | 12/2010 | Glaros | H04L 12/4633 370/389 |
| 2010/0318697 A1 | 12/2010 | Siulinski et al. | |
| 2012/0089373 A1* | 4/2012 | Hong | H04N 7/185 702/190 |
| 2012/0274775 A1* | 11/2012 | Reiffel | G06Q 30/08 348/158 |
| 2013/0016251 A1 | 1/2013 | Ogasahara | |
| 2013/0293467 A1* | 11/2013 | Norden | G06F 3/013 345/173 |
| 2014/0285672 A1 | 9/2014 | Hogasten et al. | |
| 2015/0156481 A1* | 6/2015 | Varga | H04N 13/398 348/47 |
| 2015/0286873 A1* | 10/2015 | Davis | G06F 1/1694 382/103 |
| 2015/0358560 A1 | 12/2015 | Boulanger et al. | |
| 2016/0292506 A1* | 10/2016 | Rudmann | H04N 23/45 |
| 2016/0306384 A1* | 10/2016 | Carvey | G06F 3/167 |
| 2016/0309098 A1 | 10/2016 | Montandon et al. | |
| 2016/0363653 A1* | 12/2016 | Zhang | G01S 7/4802 |
| 2017/0150118 A1* | 5/2017 | Pacheco | H04N 13/243 |
| 2017/0262034 A1* | 9/2017 | Isaac | G06F 13/4081 |
| 2018/0039821 A1* | 2/2018 | Gren | G06F 3/04842 |
| 2018/0089203 A1* | 3/2018 | Soni | G06F 16/7837 |
| 2018/0120437 A1* | 5/2018 | Webster | G06V 10/245 |
| 2018/0236927 A1* | 8/2018 | Rae | B60Q 1/0023 |
| 2019/0007590 A1* | 1/2019 | Lee | H04N 23/50 |
| 2019/0045157 A1* | 2/2019 | Venshtain | G06T 7/75 |
| 2019/0072648 A1* | 3/2019 | Iwai | G01S 7/4808 |
| 2019/0095721 A1 | 3/2019 | Ion et al. | |
| 2019/0130621 A1 | 5/2019 | Johnson et al. | |
| 2019/0199898 A1 | 6/2019 | Yonishi | |
| 2020/0089020 A1* | 3/2020 | Lee | G02B 7/08 |
| 2021/0118276 A1* | 4/2021 | Matsuzawa | G06F 1/163 |

FOREIGN PATENT DOCUMENTS

| | | |
|---|---|---|
| JP | H11212672 | 8/1999 |
| JP | 2009055553 | 3/2009 |
| JP | 2012151661 | 8/2012 |
| JP | 2012159366 | 8/2012 |
| JP | 2018169911 | 11/2018 |
| JP | 2018182367 | 11/2018 |
| WO | 2017052766 | 3/2017 |

OTHER PUBLICATIONS

Extended European Search Report, EP20836443.0, dated Apr. 4, 2023.

* cited by examiner

HYBRID CAMERAS

RELATED APPLICATION

The present application claims the benefit of the filing date of Prov. U.S. Pat. App. Ser. No. 62/871,660, filed Jul. 8, 2019, and entitled "HYBRID CAMERAS," the entire disclosure of which is incorporated herein by reference.

TECHNICAL FIELD

Embodiments of the disclosure relate to hybrid cameras having both optical cameras and infrared cameras.

BACKGROUND

An infrared camera (often referred to as a thermographic camera or a thermal imager) is a device that forms a thermal image using infrared radiation, which is analogous to an optical camera (or common camera) that forms an image using visible light. Instead of the approximate 400-700 nanometer range of the visible light camera, an infrared camera captures wavelengths in the range of infrared radiation wavelengths which can be as long as 14,000 nanometers (14 micrometers).

Some hybrid systems include both an infrared camera and an optical camera. These systems have many benefits but can come with additional costs. One example is the cost of duplicated hardware. With the inclusion of both infrared and optical cameras, each camera can have a dedicated output or transmission device, and/or the system can include duplicated onboard microprocessors to process the output of each camera. This increases the weight and power demand of such hybrid systems. In another example, such systems can spend significant resources processing overlapping images output by the two cameras to generate a combined image having aligned optical and infrared elements.

SUMMARY

The technologies disclosed herein utilizing hybrid cameras having both optical cameras and infrared cameras provide specific technical solutions to at least the technical problems mentioned in the background section and other parts of the application as well as technical problems not described herein but recognized by those of skill in the art.

The disclosed technologies can utilize a combination of an optical camera and infrared camera in a single device having a single output. The combination of optical camera and infrared camera in a single device having a single output can provide low cost production and a hybrid output having optical and infrared elements.

The device can have one input/output (I/O) interface for outputting a dual image. The dual image contains both optical and infrared elements. The blending or combining of the optical and infrared elements can be performed by a processor embedded in the dual camera device. In one embodiment, the output of the device can contain a relatively low size image overlay. In another embodiment, the device can output a full video stream having optical and infrared elements.

The disclosed technologies provide cost advantages by having a single processor for the optical and infrared cameras. The single processor can be an embedded processor including a field programmable gate array (FPGA), application-specific integrated circuit (ASIC), or a microprocessor, for example. The single processor can be attached to a board along with the two cameras. The system may include two image sensors such as complementary metal-oxide-semiconductor (CMOS) image sensors. One sensor performs optical imaging and the other sensor performs infrared radiation detection and conversion into an infrared image (for example as a component in an infrared radiation detection sensor also having a plurality of micro-mirrors). One advantage of the disclosed technologies is that the optical axes of the optical and infrared cameras can be overlapping or closely adjacent, thereby simplifying image overlay and alignment processing.

In some embodiments, an apparatus (such as a computing device) can include a circuit board along with an optical camera and an infrared camera attached to the circuit board. The optical camera can be or include a CMOS optical camera and the infrared camera can be or include a CMOS infrared camera. The apparatus can also include an onboard processor attached to the circuit board. The apparatus can also include an optical image input interface (such as an optical image input interface of the onboard processor), configured to receive an optical image signal from the optical camera. The apparatus can also include an infrared image input interface (such as an infrared image input interface of the onboard processor), configured to receive an infrared image signal from the infrared camera. The apparatus can also include a single output interface (such as a single output interface of the onboard processor), configured to transmit one or more signals processed by the onboard processor.

The onboard processor attached to the circuit board can be configured to process information from the optical image signal received by the optical image input interface and from the infrared image signal received by the infrared image input interface. And, the single output interface can be configured to transmit the information processed by the onboard processor.

In some embodiments, the onboard processor is communicatively coupled, by the single output interface, to a host processor of a host device that includes the apparatus. And, the single output interface can be configured to transmit the information processed by the onboard processor to the host processor.

In some embodiments, the onboard processor can be configured to generate a dual image output signal based on the optical image signal received from the optical camera interface via the optical image input interface and the infrared image signal received from the infrared camera via the infrared image input interface. And, the dual image output signal can include image elements from the optical image signal and the infrared image signal. Also, in such embodiments, the onboard processor can be communicatively coupled, by the single output interface, to a host processor of a host device that includes the apparatus; and, the single output interface can be configured to transmit the dual image output signal to the host processor.

In some embodiments, the optical image signal can include a field of view of the optical camera and/or an optical axis of the optical camera, and/or the infrared image signal can include a field of view of the infrared camera and/or an optical axis of the infrared camera. And, in some embodiments, the fields of view and the optical axes of the cameras overlap and can be aligned with each other physically. In some embodiments where the fields of view and the optical axes are aligned very closely but not precisely with each other, the processor can provide minimal alignment to the output images in the outputted signals.

In some embodiments, the optical image input interface can include a digital video port (DVP). In some embodiments the optical image input interface can include a differential signaling interface. In some other embodiments the optical image input interface can include a single-ended signaling interface.

In some embodiments, the infrared image input interface can include a serial peripheral interface (SPI) or an inter-integrated circuit (I2C) interface.

In some embodiments, the single output interface can include a DVP. In some embodiments, the single output interface can include a differential signaling interface. In some other embodiments, the single output interface can include a single-ended signaling interface. Also, the single output interface can include a SPI or a I2C.

In some embodiments, the infrared camera can include a thermal imaging sensor (TIS). Also, in some embodiments, the infrared camera can include an infrared radiation detection sensor comprising a plurality of micro-mirrors comprising light reflecting surfaces and infrared radiation sensing surfaces. In such examples, the infrared radiation detection sensor can be configured to deflect light incident on the reflective surfaces as a function of intensity of infrared radiation sensed by the infrared radiation sensing surfaces.

In some embodiments, a system (such as a computer system) can include a circuit board, an optical camera (such as a CMOS optical camera) attached to the circuit board, and an infrared camera (such as a CMOS infrared camera) attached to the circuit board. The system can also include an optical image input interface, configured to receive an optical image signal from the optical camera, as well as an infrared image input interface, configured to receive an infrared image signal from the infrared camera. The system can also include an onboard processor attached to the circuit board, configured to process information from the optical image signal received by the optical image input interface and from the infrared image signal received by the infrared image input interface. The system can also include a single output interface, configured to transmit the information processed by the onboard processor. And, the system can include a second processor communicatively coupled to the onboard processor by the single output interface, and configured to receive, via the single output interface, the information processed by the onboard processor. In some embodiments, the second processor is a host processor of a hosting device that also includes the circuit board, the optical camera, the infrared camera, the image input interfaces, the onboard processor, and the single output interface.

Some of the technologies described herein include a computer system. The computer system can implement the features and operations of the aforesaid methods and the aforesaid medium. The medium can specifically be implemented by memory of the system. The computer system can also include one or more processing devices such as the processors described herein.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
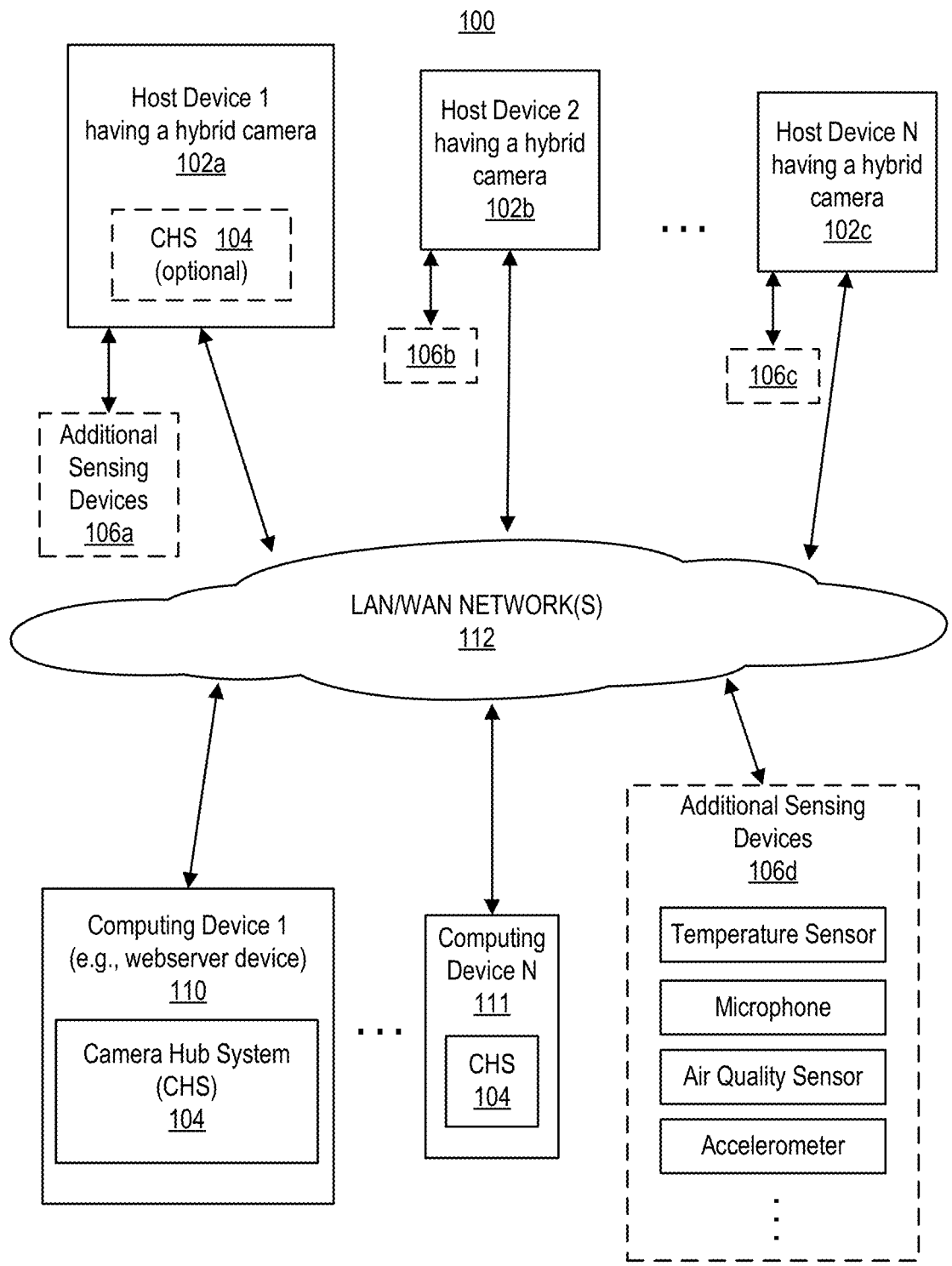
FIG. 1 illustrates an example network including computer systems, sensing devices, and host devices having hybrid cameras, in accordance with some embodiments of the present disclosure.

The disclosed technologies herein include systems and methods for implementing a combination of an optical camera and an infrared camera in a single device having a single output. The disclosed technologies provide specific technical solutions to at least the technical problems mentioned in the background section and other parts of the application as well as other technical problems not described herein but recognized by those of skill in the art. The combination of the optical camera and infrared camera in a single device having a single output can provide low cost production and a hybrid or dual output having optical and infrared elements. A blending or combining of the optical and infrared elements can be executed by a processor embedded in the single device. The output of the single device can have a relatively low size image overlay. In some embodiments, the single device can output a full video stream having optical and infrared elements. Also, the blending or combining of the optical and infrared elements can be executed by the processor and the processor can output and transmit a hybrid image that includes an overlay of the optical and infrared elements.

The systems disclosed herein can include a hybrid camera system having a single optical camera and a single infrared camera both interfaced with a single processor that can provide multiple hybrid outputs derived from signals from the cameras. The cameras can be or include CMOS sensors, such as a respective CMOS optical image sensor and a respective CMOS infrared image sensor. The combination of both separate imaging systems allows for the entire system to be contained on one circuit board. This can make the entire system inexpensive, light, and efficient with power usage. Also, this allows for a single output interface for a dual image output.

In some embodiments, a dual image can include optical image and infrared image that are separate from each other such that the recipient of the dual image can use the optical image without infrared image, or use the infrared image without using the optical image. This provides the recipient with the freedom to combine the images is a variety of ways. In some embodiments, a hybrid image can include dual image, but also can include a combined image with the infrared image and the optical image being superimposed with each other. A combined image can be convenient for the recipient, but limit the recipient in its abilities to combine the optical image and the infrared image in customized ways (e.g., different weights to the different types of images).

The communications interfaces between the cameras and an onboard processor as well as the output communications interface of the onboard processor can be standardized and can be integrated and/or retro-fitted into conventional camera applications.

In some embodiments, computer vision algorithms can be performed on independent image inputs of the cameras by the onboard or embedded processor, and the processor can provide adjoined and/or overlapping imaging and heuristics via the output communications interface of the processor.

Also, in some embodiments, the field of view and optical axes for both the optical images and thermal images from the cameras are aligned and matching each other which allows for efficient generation of unique combined and blended images of optical and thermal elements in a single output.

FIG. 1 illustrates an example network including computer systems, sensing devices, and host devices having hybrid cameras (i.e., system 100), in accordance with some embodiments of the present disclosure. The system 100 can implement any of the aforesaid components and operations as well as any of the components or operations described herein.

The system 100 is shown including host devices that each have a hybrid camera device having an optical camera, an infrared camera, and a single processor each attached to a single circuit board (e.g., see host device 102a, host device 102b, and host device 102c). It is also shown that a host device in the system 100 can include at least part of a camera hub system 104 (e.g., see host device 102a). The camera hub system 104 (CHS 104) can implement at least some of the data processing described herein that is or is not executed by the onboard processor.

A part of the camera hub system 104 can be included in or connected to an additional sensing device such as one of additional sensing devices 106a, 106b, 106c, and/or 106d. The additional sensing devices (e.g., additional sensing devices 106a, 106b, 106c, and 106d) can include a temperature sensor, an acoustical wave sensor, a microphone, an air quality sensor, an accelerometer, or any other type of sensor with connectivity. As shown in FIG. 1, additional sensing devices 106a, 106b, 106c, and 106d can be directly connected to a host device having a hybrid camera (e.g., host device 102a, 102b, or 102c) or indirectly connected to a host device having a hybrid camera via one or more local area networks and/or wide area networks (e.g., one or more local area networks and/or wide area networks 112).

Figure 2:
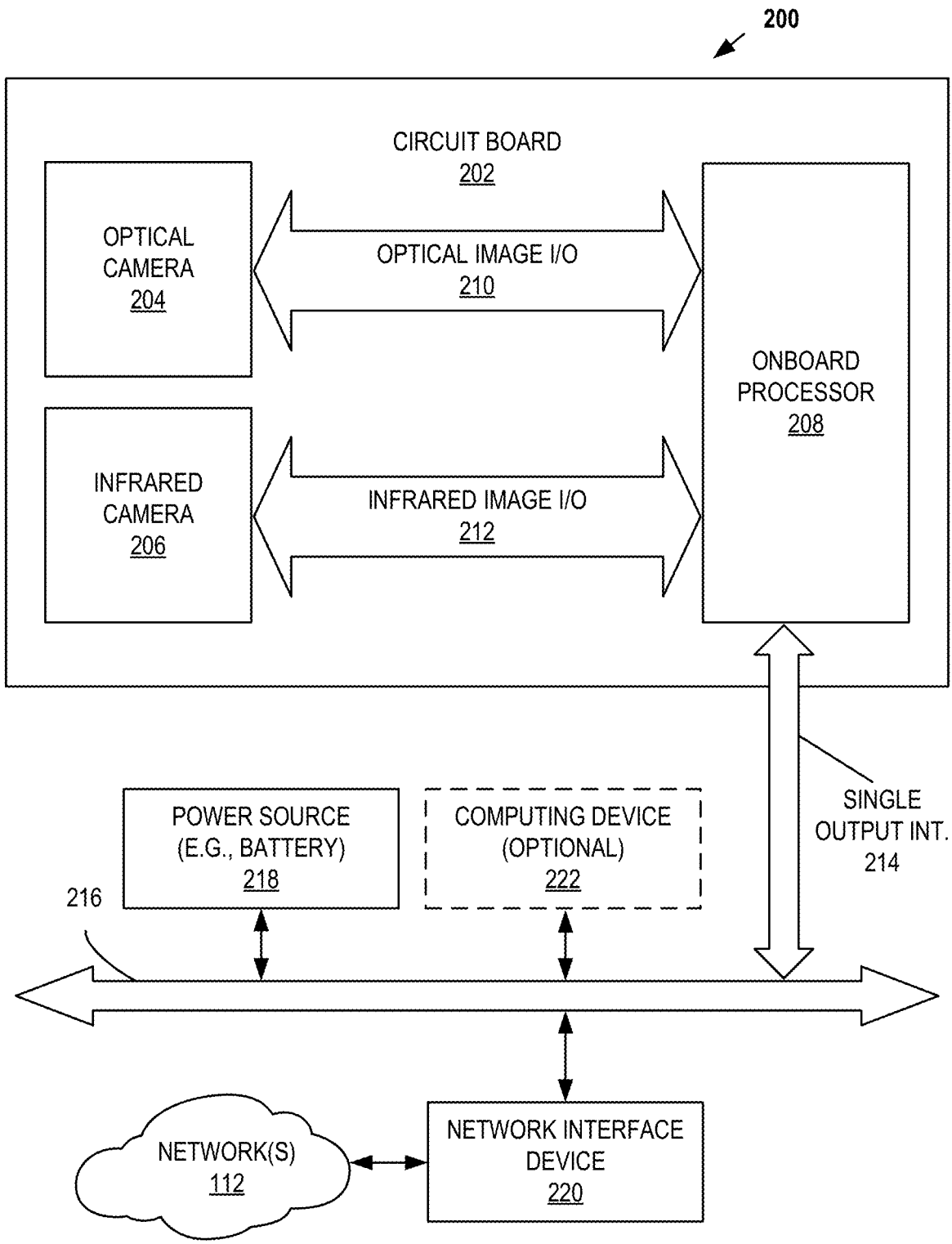
FIG. 2 is a block diagram of example aspects of a host device having a hybrid camera, in accordance with some embodiments of the present disclosure.

The system can also include one or more computing devices that can each include a part of the camera hub system 104 (e.g., see computing device 110 and computing device 111). An implementation for any one of the computing devices 110 and 111 is depicted in greater detail in FIG. 6. An implementation for any one of the host devices 102a, 102b, and 102c is depicted in FIG. 2. Also, FIG. 4 depicts an alternative implementation of any one of the host devices 102a, 102b, and 102c. And, the host devices with hybrid cameras can also include a computing device in some embodiments (e.g., see FIG. 2 and the computing device depicted in FIG. 3).

The system 100 is also shown including one or more local area networks and/or wide area networks 112 (LAN/WAN network(s) 112) which are shown communicatively coupling the host devices having hybrid cameras, computing devices, and additional sensing devices depicted in FIG. 1. The LAN/WAN network(s) 112 can include one or more local area networks (LAN(s)) and/or one or more wide area networks (WAN(s)). The LAN/WAN network(s) 112 can include the Internet and/or any other type of interconnected communications network. The LAN/WAN network(s) 112 can also include a single computer network or a telecommunications network. More specifically, the LAN/WAN network(s) 112 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

Each shown component of the system 100 can include a computer system which can include memory that can include media. The media can include or be volatile memory components, non-volatile memory components, or a combination of such. In some embodiments, the memory is a storage system. An example of a storage system is a SSD. In some embodiments, the memory is a hybrid memory/storage sub-system. In general, each of the computer systems can include a host system that uses the memory. For example, the host system can include a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

A memory system controller (hereinafter referred to as "controller") can communicate with the memory components to perform operations such as reading data, writing data, or erasing data at the memory components and other such operations. The controller can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or other suitable processors. The controller can include a processor (processing device) configured to execute instructions stored in local memory. The local memory of the controller can include an embedded memory configured to store instructions for performing various processes, operations, logic flows, and routines that control operation of the memory, including handling communications between the memory and the host system. In general, the controller can receive commands or operations from the host system and can convert the commands or operations into instructions or appropriate commands to achieve the predetermined desired access to the memory components.

The memory can also include additional circuitry or components. In some embodiments, the memory can include a cache or buffer (e.g., DRAM) and address circuitry (e.g., a row decoder and a column decoder) that can receive an address from the controller and decode the address to access the memory components.

In some aspects of the present disclosure, the memory can include all or parts of the CHS 104. In some embodiments, the controller includes at least a portion of the CHS 104. For example, the controller can include a processor (processing device) configured to execute instructions stored in local memory for performing the operations described herein such as the operations described herein associated with the CHS 104. In some embodiments, the CHS 104 is part of the host system, an application, or an operating system.

The CHS 104 can use the memory, the memory components, and the host system to implement technologies for sensing a scene or field of view by at least a hybrid camera of one of the host device 102a, 102b, or 102c and operating the camera and a camera hub accordingly. Further details with regards to the operations of the CHS 104 are described below. As shown in FIG. 1, the system 100 can include the parts of the CHS 104 within one or more electronic devices (e.g., see computing devices 110 and 111 and computer system 600).

FIG. 2 is a block diagram of example aspects of a host device having a hybrid camera (i.e., host device 200), in accordance with some embodiments of the present disclosure. FIG. 2 also illustrates at least one part of the host device 200 (e.g., see onboard processor 208 and optional computing device 222) within which a set of instructions, for causing a machine of the host device 200 to perform one or more aspects of any one or more of the methodologies discussed herein, can be executed. In alternative embodiments, the machine can be connected (e.g., networked) to other machines in a LAN, an intranet, an extranet, and/or the Internet. The machine can operate in the capacity of a client machine in client-server network environment, as a peer machine in a peer-to-peer (or distributed) network environment, or as a client machine in a cloud computing infrastructure or environment.

The host device 200 includes a circuit board 202 as well as an optical camera 204, an infrared camera 206, an onboard processor 208, optical image input interface 210, infrared image input interface 212, and a single output interface 214 all attached to the circuit board. At least the parts attached to the circuit board 202 (e.g., optical camera 204, infrared camera 206, onboard processor 208, optical image input interface 210, infrared image input interface 212, and single output interface 214) make up the hybrid camera. In some embodiments, the entire host device 200 is considered a hybrid camera.

As shown, the single output interface 214, which can be a part of the onboard processor 208, is connected to a bus 216. The bus 216 may be part of another circuit board or the circuit board 202. Also, as shown, the host device 200 includes a power source 218 (e.g., a battery), a network interface device 220, the bus 216, and optionally a computing device 222 (e.g., see computer system 300 depicted in FIG. 3). The circuit board 202 and its attached parts as well as the power source 218, the network interface device 220, and the optional computing device 222 can be communicatively coupled with each other via the bus 216. The network interface device 220 can communicate with other devices over the LAN/WAN network(s) 112 of FIG. 1. An example computing device like the optional computing device 222 is described in further detail in the section describing computer system 300 depicted in FIG. 3.

The circuit board 202 can be or include a thin rigid board containing an electric circuit, such as a printed circuit. For example, the circuit board 202 can be or include a printed circuit board (PCB).

The optical camera 204 can be or include a CMOS optical image sensor, and imaging of the optical camera is based on captured light within the visible light spectrum.

The infrared camera 206 can be or include a CMOS infrared image sensor and imaging of the infrared camera is based on captured infrared radiation. In some embodiments, the infrared camera can be or include a passive infrared sensor (a PIR sensor) that can be any type of infrared radiation sensor, such as a PIR sensor for detecting motion with captured infrared radiation. In some embodiments, the infrared camera can be or include a thermal imaging sensor (a TIS). A key feature of the PIR sensor is that it is less robust (e.g., lower performing and/or lower resolution) than the TIS. In some embodiments, the infrared camera can be or include an infrared radiation detection sensor (e.g., the TIS) comprising at least a plurality of micro-mirrors comprising light reflecting surfaces and infrared radiation sensing surfaces. The infrared radiation detection sensor is configured to deflect light incident on the reflective surfaces as a function of intensity of infrared radiation sensed by the infrared radiation sensing surfaces.

Non-visual environment monitoring and monitoring of human presence by the infrared camera 206 and the optical camera 204 can be utilized in applications for security and safety, energy savings, fire detection, people counting and behavior analysis. The technologies used for these kinds of applications can include a combination of infrared technology and optical technology. The infrared technology can include uncooled thermal imaging. The PIR sensor can include infrared technology. The TIS can provide a higher accuracy and negligible false alarm rate over a PIR sensor.

In some embodiments, the infrared camera 206 can include the TIS that can include an uncooled thermo-mechanical bi-material microelement sensor, which converts incident infrared radiation into a micromechanical displacement. It is to be understood that the TIS can be or include another type of thermal sensor instead of an uncooled thermo-mechanical bi-material microelement sensor. The microelement is often referred to as a micro-cantilever or micro-mirror. The operational principle is based on the bi-material effect, where a material compound mismatch of coefficients of thermal expansion leads to a micromechanical motion upon temperature change. In some implementations one microelement represents one radiation sensing pixel and the sensors have an array of microelements (e.g., micro-cantilevers and/or micro mirrors). In some embodiments, the TIS can include a CMOS image sensor to capture the image of the light spots generated by the micro mirrors.

Every object in an environment has a unique thermal footprint and therefore thermal imaging with the TIS offers detection of human presence in an enclosed environment with a very high accuracy and negligible false alarm rate. Human body temperature and emissivity in the long wave infrared band is in most cases distinguishably higher than the thermal footprint of typical indoor and outdoor environmental surroundings. Thermal imaging, via the TIS, with a limited spatial resolution can be sufficient to accurately detect humans at short distances without revealing the individual's identity. This aspect of environmental and human detection and monitoring is of general interest with regards to privacy protection. Current thermal imaging technology solutions are inadequate for low-cost, high-volume applications due to their production complexity and expense. A need exists for ubiquitous limited spatial resolution infrared imagers at a commodity price. The TIS is an example of a potentially inexpensive thermal imager with limited spatial resolution based on an uncooled thermo-mechanical bi-material microelement sensor, which converts incident infrared radiation into a micromechanical displacement.

The TIS is an intermediate level device (e.g., in performance and/or in sensing resolution) between a passive infrared sensor (e.g., a PIR sensor) and a full featured image sensor (such as included with the optical camera 204). The TIS differs from the optical camera in that the imaging of the optical camera is based on visible light or radiation within the visible light spectrum. The TIS, in most embodiments, is based on infrared radiation. The TIS differs from a PIR sensor in that it can have a different structure than the PIR sensor and the PIR sensor has less spatial resolution than the TIS.

In embodiments where the TIS includes an array of microelements (e.g., micro-cantilevers and/or micro mirrors), the sensitivity and/or precision of the TIS can be dynamically adjusted (e.g., based on a user request) by changing the methods to measure the positions of the light spots of the microelements captured in an image of the imaging surface of the TIS. A less computationally demanding method can be implemented in a processor provided in the host device (e.g., see processor 208 or processor 402 of host device 400 depicted in FIG. 4). And, a more computationally demanding method can be implemented on a separate device, such as an auxiliary device (e.g., see computer system 600 depicted in FIG. 6) connected physically to the host device or connected in a local area network or a remote server connected in the Internet (e.g., connected over network(s) 112).

In embodiments where the TIS includes an array of microelements, the radiation intensity measured at each microelement can be a function of the displacement of a light spot reflected on to the image surface by the corresponding microelement. When the light from the light source emits on the array of microelements, the microelements reflect the light to form the light spots on the imaging surface of the TIS. The infrared radiation absorbed in the microelements causes the microelements to rotate and thus move the light spots on the imaging surface of the TIS. The higher the infrared radiation intensity influx onto a microelement, the further the corresponding movement of the light spot reflected by the microelement on the imaging surface. The distances of the light spots moved by the microelements are a function of the responsivity of the microelements and the geometry of the optical system. For example, the distance of a light spot moved by a microelement is a function of the rotation of the microelement per unit of power absorbed in the microelement and a function of a distance that a light spot moves per unit of microelement rotation.

When the physical properties of the TIS are constrained and fixated, e.g., the microelements are fixed, the optical path between the light source and the imaging surface can be in a constant position to another; and, further when the thermo-mechanical properties of the microelements and the properties of the TIS are constrained, the radiation sensitivity of the TIS is determined by the degree of precision of which the moving dots or moving patterns can be allocated.

In some embodiments, a light spot on the imaging surface of the TIS can move to a position by distance Y as a result of a microelement rotation. The precision of determining the displacement Y can depend on the following factors: A) the quality of the light spot as created by the TIS (e.g. size, shape, intensity of spot or pattern), B) accuracy/level of precision of detection of light spots on the image plane of the TIS (or photodetector, or camera of the TIS, for example the performance and quality of the CMOS image sensor, its pixel size, pixel sensitivity, integration time for the TIS), C) the methods used to detect the light spots and determine their displacements, and D) how much processing power is available to execute the processes.

The processes used to calculate the magnitude of dot displacements or the pattern change on the image surface of the TIS can have a significant impact on the sensitivity of the TIS.

The image from the image plane of the TIS (e.g. from the photodetector of the TIS) can be processed on the computing device or the signal processing unit as an input (e.g., see processor 208 or processor 402). Through the processing of the image obtained from the image plane of the TIS, the computing device or the signal processing unit can generate a thermal image by converting for example light spot movements, or pattern shifts, into an image representing radiation (or thermal) intensity, which can be further interpreted by the human eye or further image analysis algorithms. The computing device that performs the computation to generate the thermal image from the optical images of light spot movements, or pattern shifts, does not have to be physically attached to the TIS. The optical image from the image plane of the TIS showing the light spot movements, or pattern shifts can be used as an input to the computing device that converts the optical image to a thermal image.

For example, when the image of the light spots on the imaging surface of the TIS, as captured by the photodetector of the TIS, is analyzed by a relatively high-performance computing device (e.g. FPGA, ASIC or processor), the positions of the light spots can be determined at a relatively high level of precision using a sophisticated and computationally intensive method. Such method can include for example a Gaussian or polynomial fit to each light spot and move the fit with the displacement of the spot on the image plane of the TIS. The determination of a light spot fit can be very precise, thus even relatively small displacements of spots can be detected. The improved precision in measuring the positions of the light spots in the image improves the sensitivity and/or precision of the TIS.

However, when the same image of the light spots on the imaging surface, as captured by the photodetector of the TIS, is analyzed using a relatively low-cost computing device (e.g. such as a micro-controller), the positions of the light spots can be determined using a simplified, computationally efficient method at a relatively low level of precision. Such a method can include a simple threshold method of determining the light spot movements at a relatively coarse level. The reduced computation intensity allows the use of low-cost computing hardware in generating the radiation/temperature measurements, which can be implemented in the TIS to reduce the bandwidth and/or power consumption requirements in the communications over a computer network by transmitting the radiation/temperature measurements instead of the full image of the light spots.

Distinguishing and tracing individual mirror patterns in an array can be computational demanding. In such case relatively high-performing computing device can be used to maximize each light spot's dynamic range and enable a high target temperature detection range (temperature span) as the light spots might overlap or travel beyond its intrinsic spot-to-spot pitch distance and identifying and tracing individual light spots might be necessary for high dynamic range.

To improve the precision in determining the light spot movement or light pattern changes, the computing device can optionally use computer vision or image processing analysis, such as blob detection, blob count, blob tracking, threshold detection, etc.

Averaging of images from the image plane can reduce noise and to increase accuracy in the determination of the position of a light spot. In such instances, additional computational power can be used for performing averaging and noise suppression.

The accuracy of the positions of the light spots can be dynamically adjusted based on the resolution of the image of the light spots. Increasing the resolution of the image of the light spots can improve the sensitivity and/or precision, as well as the computation involved, the bandwidth for transmission of the image, and/or the power consumption in computation and/or transmission.

Not shown in FIG. 2, the host device 200 can also include a light emitter which can be a part of one of the cameras or separate from the cameras or separate from the host device. The light emitter can include a light emitting diode (LED). The light emitter can be a light source for the field of views of the cameras of the host device 200.

The onboard processor 208 can be or include an embedded processor including a field programmable gate array (FPGA), application-specific integrated circuit (ASIC), or a microprocessor, for example.

The onboard processor 208 can be configured to process information from an optical image signal received from the optical camera 204 via the optical image input interface 210 and from an infrared image signal received from the infrared camera 206 via the infrared image input interface 212. The onboard processor 208 can be configured to provide dual processed information in a single output signal based on the processed information from the optical image signal and the infrared image signal. The onboard processor 208 can be configured to generate a dual image output based on an optical image signal received from the optical camera 204 via the optical image input interface 210 and an infrared image signal received from the infrared camera 206 via the infrared image input interface 212.

Fields of view and optical axes of the cameras 204 and 206 can be aligned with each other physically by the configuration of the cameras, or through signal processing such as by signal processing by the onboard processor 208 or another processor of the host device 200 (e.g., see host processor 402 depicted in FIG. 4). The optical image signal can include a field of view of the optical camera 204 and an optical axis of the optical camera. Also, the infrared image signal can include a field of view of the infrared camera 206 and an optical axis of the infrared camera. And, these fields of view and optical axes of the cameras can be aligned with each other physically or through signal processing.

In some embodiments, the onboard processor 208 can execute the algorithm that converts the image of reflected spots to thermal pixels and the algorithm to blend optical and thermal images.

The optical image input interface 210 can be configured to receive an optical image signal from the optical camera 204. The optical image input interface 210 can be or include a digital video port (DVP). Also, optical image input interface 210 can be or include a differential signalling interface or a single-ended signalling interface.

The DVP used by the parts described herein can include a DVP for High-Definition Multimedia Interface (HDMI), Video Graphics Array (VGA), Digital Visual Interface (DVI), DisplayPort, or another type of video format or interface. The DVP used by the parts described herein can include lower speed parallel interfaces for shorter distances. The DVP used by the parts described herein can include a DVP that allows for all bits of data per pixel being sent at once.

Also, the optical image input interface 210 can use standard interface types used for communication of image or video data. For example, the optical image input interface 210 can include use of Mobile Industry Processor Interface (MIPI) technologies. MIPI technologies can use high speed differential serial interfaces. MIPI technologies can use an adjustable amount of data lines (e.g. four data lines), depending on physical configuration of the optical image input interface 210. For example, D-PHY, M-PHY, C-PHY, and A-PHY physical layer standards can be used for the configuration. Also, CSI-1, CSI-2, and CSI-3 camera serial interface standards can be used. D-PHY can be used for higher resolution cameras to host communications in unidirectional and/or half duplex. D-PHY allows for low power mode communications too. C-PHY can be used for low-cost and low-resolution camera to host communications. M-PHY can be used as an alternative to D-PHY and CSI-2. M-PHY is similar to D-PHY but also allows for chip-to-chip communications and bi-directional and/or full duplex communications. CSI-2 is commonly used for mobile phone camera interfaces and it can be used with many video formats and one to four pairs of differential signalling. In general, MIPI technologies can have strict inter-operability baud rate and communication frequency definitions. Also, MIPI technologies allow for connecting a single input device to multiple communication buses without a splitter or a switch.

Different from MIPI technologies, DVP technologies, in general, are simpler to integrate than MIPI technologies. Usually, a DVP has strict inter-operability baud rate and communication frequency definitions and are not user selectable. And, with a DVP, it is only possible to connect a single input device to each communication bus without a splitter or switch.

The infrared image input interface 212 can be configured to receive an infrared image signal from the infrared camera 206. The infrared image input interface 212 can be or include a serial peripheral interface (SPI) and/or an inter-integrated circuit (I2C) interface.

Also, the infrared image input interface 212 can use standard interface types used for communication of image or video data. For example, as mentioned, the infrared image input interface 212 can include use of SPI technologies. SPI technologies can use four communication lines. SPI technologies are flexible in that they can be slower or faster than DVP or MIPI technologies depending on the configuration. SPI technologies also are not exclusive to camera input/output communications but can be used in conjunction with a many different sensor types (such as types included in the additional sensing devices 106a, 106b, 106c, or 106d depicted in FIG. 1). Also, SPI technologies do not have strict inter-operability baud rate or communication frequency definitions.

Also, for example, as mentioned, the infrared image input interface 212 can include use of I2C technologies. I2C technologies can use two communication lines. I2C technologies can be limited to four different possible baud rate and communication frequency speeds (e.g., standard mode of 100 kBit/s, full speed mode of 400 kBit/s, fast mode of 1

MBit/s, and high-speed mode of 3.2 MBit/s). With I2C, each device connected to a communication bus is software addressable by a unique address, and I2C can use multi-master bus providing arbitration and collision detection.

The single output interface 214 can be configured to transmit one or more signals processed by the onboard processor. The single output interface 214 can be or include a DVP. Also, the single output interface 214 can be or include a differential signalling interface or a single-ended signalling interface. Also, the single output interface 214 can be or include a MIPI technology. Also, the single output interface 214 can be or include a SPI and/or an I2C technology. The single output interface 214 can include an interface for a single bulk transfer. Also, the single output interface 214 can include two or more interfaces combined into a single output interface physically. The single output interface 214 can include one type of physical connector. In some embodiments, the output interface 214 can include multiple types of physical connectors combined into one output interface.

The interface configurations of the hybrid camera depend on preferences for use of the host device or the hybrid camera. For example, when relative costs are a low or medium priority, it can be advantageous to use DVP for the optical image input interface 210. When relative costs are a high or medium priority, it can be advantageous to use MIPI for the optical image input interface 210.

When relative costs are a low or medium priority, it can be advantageous to use DVP, SPI, or I2C for the single output interface 214. When relative costs are a high or medium priority, it can be advantageous to use MIPI for the single output interface 214. In general, MIPI can be used when relative costs can be high.

Also, for example, when relative speed and power consumption are a low or medium priority, it can be advantageous to use I2C for the infrared image input interface 212. When relative speed and power consumption are a high or medium priority it can be advantageous to use SPI for the infrared image input interface 212. When relative speed and power consumption are a low or medium priority it can also be advantageous to use I2C for the single output interface 214. When relative speed and power consumption are a high or medium priority it can be advantageous to use DVP, MIPI, or SPI for the single output interface 214. In general, I2C can be used when relative speed and power consumption is low priority.

Table 1 provides a configuration summary for the interfaces depicted in FIGS. 2 and 4.

| Interface 210 | Interface 212 | Interface 214 | Relative Cost | Relative Speed/Power |
|---|---|---|---|---|
| DVP | SPI | DVP | Low | High |
| MIPI | SPI | DVP | Medium | High |
| DVP | I2C | DVP | Low | Medium |
| MIPI | I2C | DVP | Medium | Medium |
| DVP | SPI | MIPI | Medium | High |
| MIPI | SPI | MIPI | High | High |
| DVP | I2C | MIPI | Medium | Medium |
| MIPI | I2C | MIPI | High | Medium |
| DVP | SPI | SPI | Low | High |
| MIPI | SPI | SPI | Medium | High |
| DVP | I2C | SPI | Low | Medium |
| MIPI | I2C | SPI | Medium | Medium |
| DVP | SPI | I2C | Low | Medium |
| MIPI | SPI | I2C | Medium | Medium |
| DVP | I2C | I2C | Low | Low |
| MIPI | I2C | I2C | Medium | Low |

Figure 3:
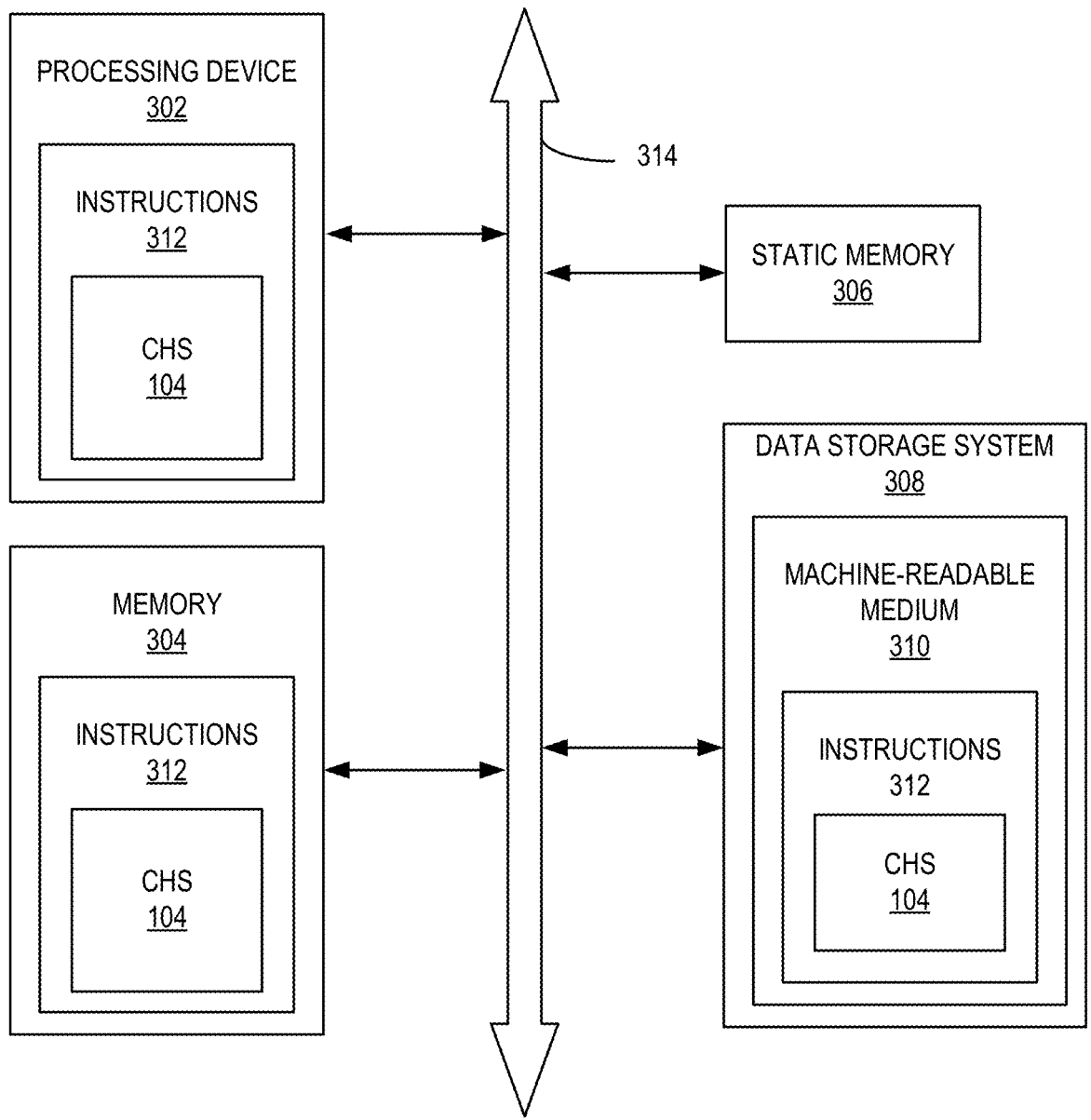
FIG. 3 is a block diagram of example aspects of an example computer system that can be installed in or connected to a host device having a hybrid camera, in accordance with some embodiments of the present disclosure.
Figure 4:
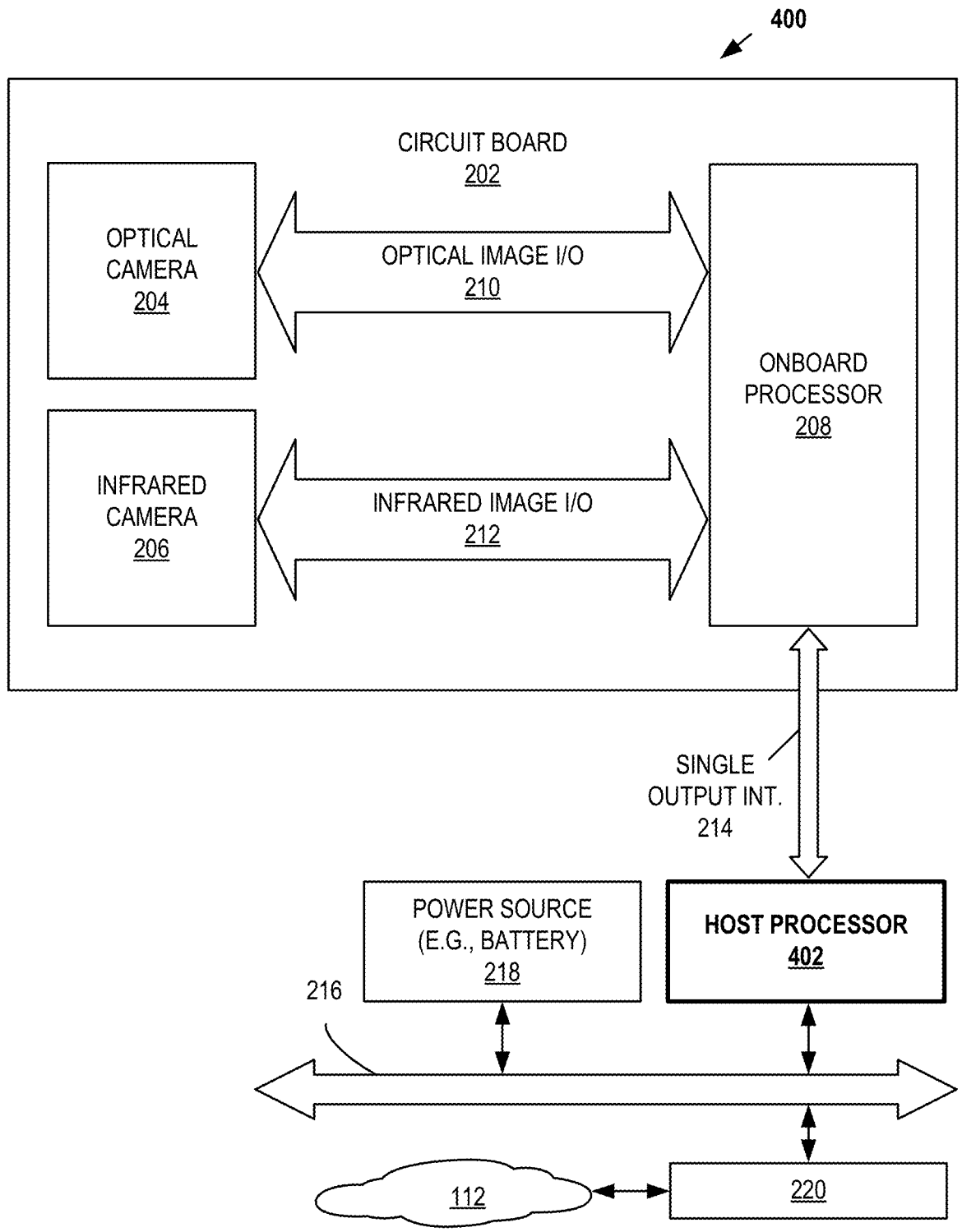
FIG. 4 is a block diagram of example aspects of another host device having a hybrid camera, in accordance with some embodiments of the present disclosure.

FIG. 3 is a block diagram of example aspects of an example computer system 300 that can be installed in or connected to a host device having a hybrid camera, in accordance with some embodiments of the present disclosure (e.g., see optional computing device 222 depicted in FIG. 2). FIG. 3 illustrates parts of the computer system 300 within which a set of instructions, for causing a machine of the system to perform aspect(s) of any one or more of the methodologies discussed herein, can be executed. In some embodiments, the computer system 300 can correspond to a host system that includes, is coupled to, or utilizes memory or can be used to perform the operations of a controller (e.g., to execute an operating system to perform operations corresponding to one or more aspects of the CHS 104 shown in FIG. 1). In alternative embodiments, the machine can be connected (e.g., networked) to other machines in a LAN, an intranet, an extranet, and/or the Internet. The machine can operate in the capacity of a client machine in client-server network environment, as a peer machine in a peer-to-peer (or distributed) network environment, or a client machine in a cloud computing infrastructure or environment.

The machine of system 300 can be any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform aspect(s) of any one or more of the methodologies discussed herein.

The example computer system 300 includes a processing device 302, a main memory 304 (e.g., read-only memory (ROM), flash memory, dynamic random-access memory (DRAM), etc.), a static memory 306 (e.g., flash memory, static random-access memory (SRAM), etc.), and a data storage system 308, which communicate with each other via bus 314.

The processing device 302 represents one or more general-purpose processing devices such as a microprocessor, a central processing unit, or the like. More particularly, the processing device can be a microprocessor or a processor implementing other instruction sets, or processors implementing a combination of instruction sets. The processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 312 for performing some of the operations discussed herein, such as operations associated with the CHS 104 shown in FIG. 1. The network interface device for system 300 is not shown since system 300 is an example of a computing device that can be installed in or connected to a host device having a hybrid camera, which includes a network interface device (e.g., see host device 200).

Also, not shown in FIG. 3, the computer system 300 can include an input/output interface, such as for receiving feedback from a feedback source external to host device 200 and system 300. The input/output interface can include a user interface to receive user input as feedback on computer vision data.

The data storage system 308 can include a machine-readable storage medium 310 (also known as a computer-readable medium) on which is stored one or more sets of instructions 312 or software embodying aspect(s) of any one or more of the methodologies or functions described herein, such as operations associated with the CHS 104 shown in FIG. 1. The instructions 312 can also reside, completely or at least partially, within the main memory 304 and/or within the processing device 302 during execution thereof by the computer system 300, the main memory 304 and the processing device 302 also constituting machine-readable storage media.

In one embodiment, the instructions 312 include instructions to implement functionality corresponding to the CHS 104 shown in FIG. 1. While the machine-readable storage medium 310 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform aspect(s) of any one or more of the methodologies of the present disclosure. The term "machine-readable storage medium" shall accordingly be taken to include, but not be limited to, solid-state memories, optical media, and magnetic media.

FIG. 4 is a block diagram of example aspects of another host device having a hybrid camera (i.e., host device 400), in accordance with some embodiments of the present disclosure. As shown, host device 400 is similar to host device 200 except instead of the single output interface 214 being directly connected to the bus 216 it is directly connected to a host processor 402. The host processor 402 is connected to other parts of the host device 400 via the bus 216. In some embodiments, the host device can include the host processor 402 but the onboard processor 208 can also be connected to the bus 216 directly (not shown in FIG. 4).

FIG. 4 also illustrates at least one part of the host device 400 within which a set of instructions, for causing a machine of the host device 400 to perform one or more aspects of any one or more of the methodologies discussed herein, can be executed (e.g., see onboard processor 208 and host processor 402). In alternative embodiments, the machine can be connected (e.g., networked) to other machines in a LAN, an intranet, an extranet, and/or the Internet. The machine can operate in the capacity of a client machine in client-server network environment, as a peer machine in a peer-to-peer (or distributed) network environment, or as a client machine in a cloud computing infrastructure or environment.

The host device 400 similarly includes circuit board 202 as well as optical camera 204, infrared camera 206, onboard processor 208, optical image input interface 210, infrared image input interface 212, and single output interface 214 which are all attached to the circuit board. Similarly, at least the parts attached to the circuit board 202 make up the hybrid camera of host device 400. In some embodiments, the entire host device 400 is considered the hybrid camera.

As shown in FIG. 4, the single output interface 214 is connected to bus 216, via the host processor 402. The host processor 402 and the bus 216 may be part of another circuit board or the circuit board 202. Also, in some embodiments, a connection between the onboard processor 208 and the bus 216 bypasses the host processor 402. Also, as shown in FIG. 4, the host device 400 includes power source 218 (e.g., a battery), network interface device 220, and the bus 216. In some embodiments, the host device 400 can also include computing device 222 (e.g., see computer system 300 depicted in FIG. 3). The circuit board 202 and its attached parts as well as the power source 218, the network interface device 220, the host processor 402, and the optional computing device 222 can be communicatively coupled with each other via the bus 216. The network interface device 220 of host device 400 can communicate with other devices over the LAN/WAN network(s) 112 of FIG. 1.

The host processor 402 can be or include an embedded processor including a field programmable gate array (FPGA), application-specific integrated circuit (ASIC), or a microprocessor, for example.

Figure 5:
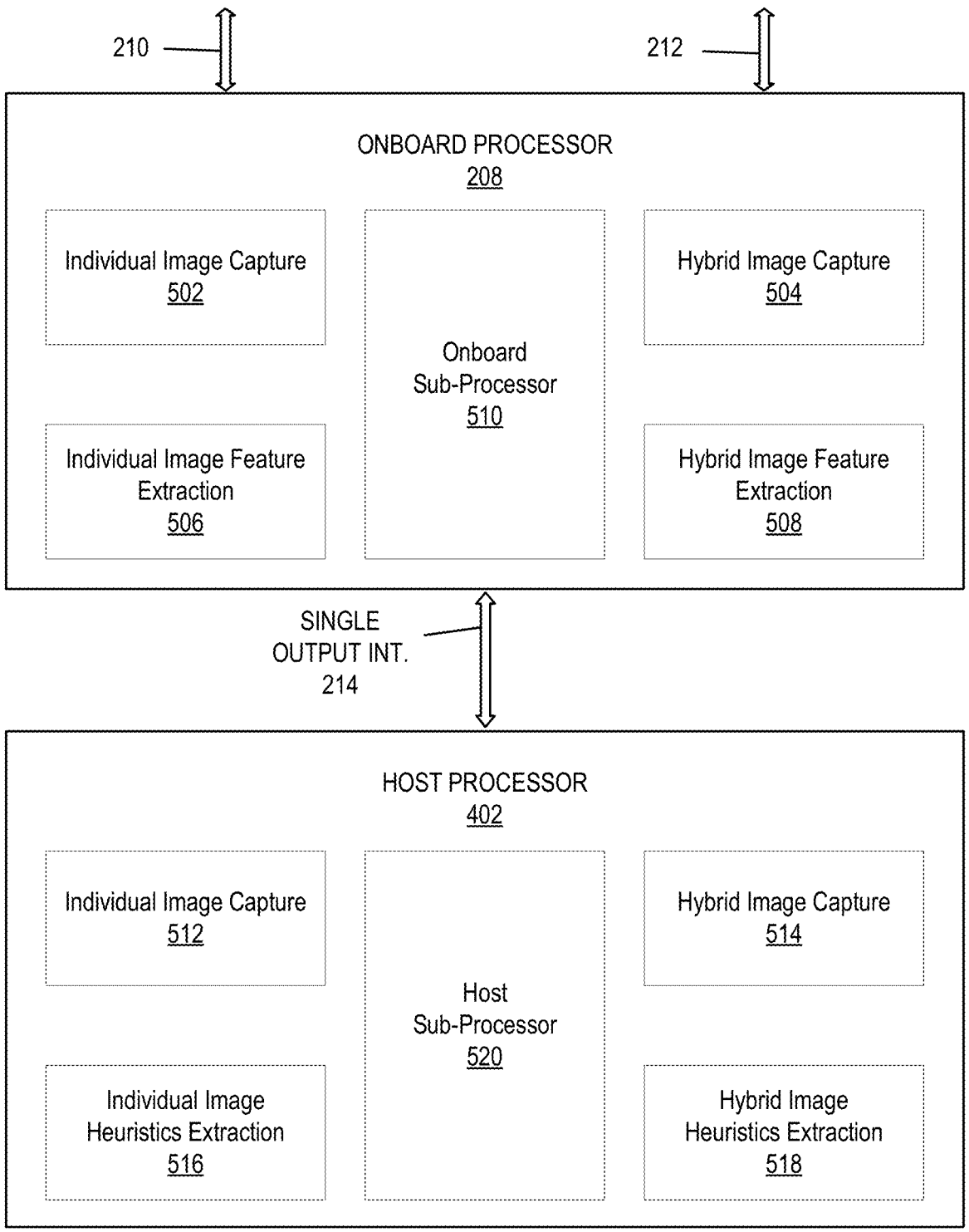
FIG. 5 is a block diagram of example aspects of an onboard processor and a host processor, in accordance with some embodiments of the present disclosure.

FIG. 5 is a block diagram of example aspects of onboard processor 208 and host processor 402 of host device 400, in accordance with some embodiments of the present disclosure. As shown, the onboard processor 208 includes an individual image capture circuit 502, a hybrid image capture circuit 504, an individual image feature extraction circuit 506, a hybrid image feature extraction circuit 508, and an onboard sub-processor 510. Also, as shown, the host processor 402 includes an individual image capture circuit 512, a hybrid image capture circuit 514, an individual image heuristics extraction circuit 516, a hybrid image heuristics extraction circuit 518, and a host sub-processor 520. Each of the circuits of the onboard processor 208 and the host processor 402 can be a part of the CHS 104 and can exist in the host device 400 and/or on one or more computing devices external to the host device 400.

Figure 8:
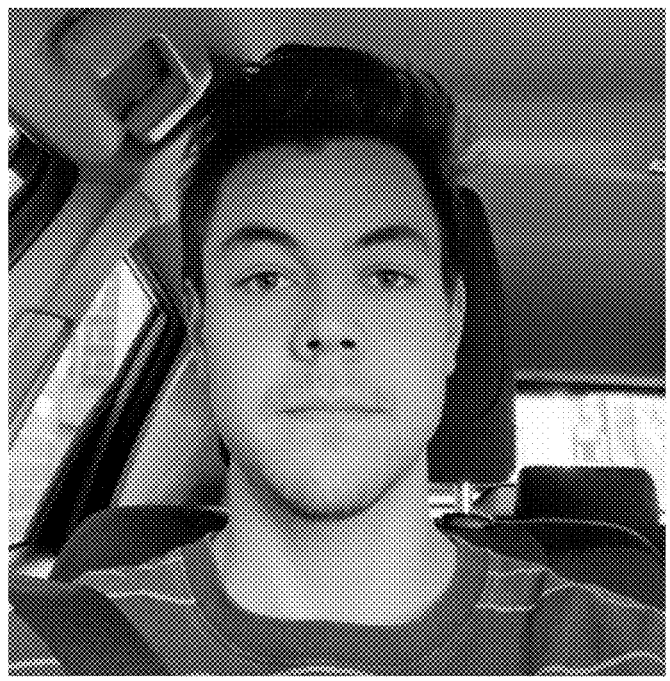
FIG. 8 illustrates an example image derived from an optical image signal, in accordance with some embodiments of the present disclosure.
Figure 9:
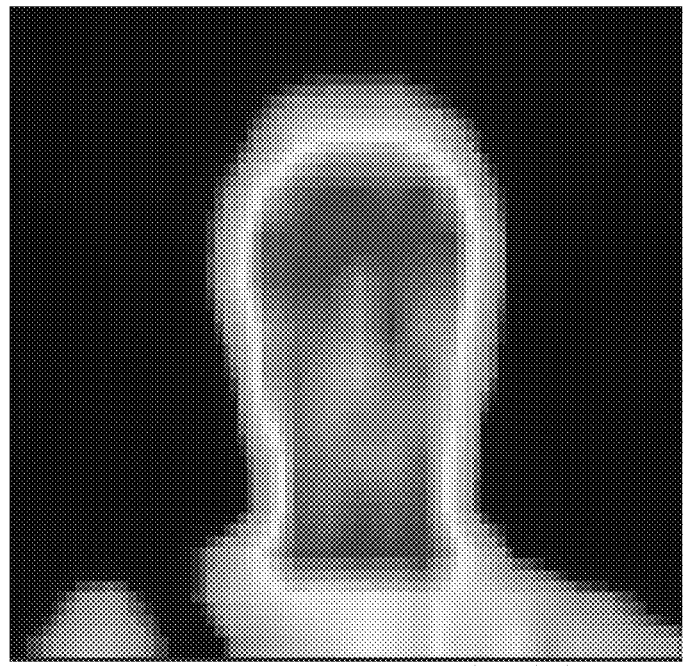
FIG. 9 illustrates an example image derived from an infrared image signal, in accordance with some embodiments of the present disclosure.

The individual image capture circuit 502 of the onboard processor 208 can be configured to receive an optical image signal from the optical camera 204 via optical image input interface 210. The individual image capture circuit 502 can also be configured to derive an individual optical image based on the received optical image signal. For an example depiction of a derived optical image (such as an optical image derived from the individual image capture circuit 502) see FIG. 8. The individual image capture circuit 502 of the onboard processor 208 can also be configured to receive an infrared image signal from the infrared camera 206 via infrared image input interface 212. The individual image capture circuit 502 can also be configured to derive an individual infrared image based on the received infrared image signal. For an example depiction of a derived infrared image (such as an infrared image derived from the individual image capture circuit 502) see FIG. 9.

The hybrid image capture circuit 504 of the onboard processor 208 can be configured to receive an optical image signal from the optical camera 204 via optical image input interface 210 as well as receive an infrared image signal from the infrared camera 206 via infrared image input interface 212. The hybrid image capture circuit 504 can also be configured to derive a dual image output signal and then a dual image based on the received optical image signal and the received infrared image signal. For an example depiction of a derived dual image (such as a derived dual image including optical and infrared image elements derived from the hybrid image capture circuit 504) see FIG. 10.

The individual image feature extraction circuit 506 of the onboard processor 208 can be configured to determine graphical features from the optical image or the infrared image derived by the individual image capture circuit 502 based on a computer vision algorithm. The individual image feature extraction circuit 506 of the onboard processor 208 can also be configured to add labeling to the optical image or the infrared image indicating the determined graphical features.

The hybrid image feature extraction circuit 508 of the onboard processor 208 can be configured to determine graphical features from the dual image derived by the hybrid image capture circuit 504 based on a computer vision algorithm. The hybrid image feature extraction circuit 508 of the onboard processor 208 can also be configured to add labeling to the dual image indicating the determined graphical features.

Figure 10:
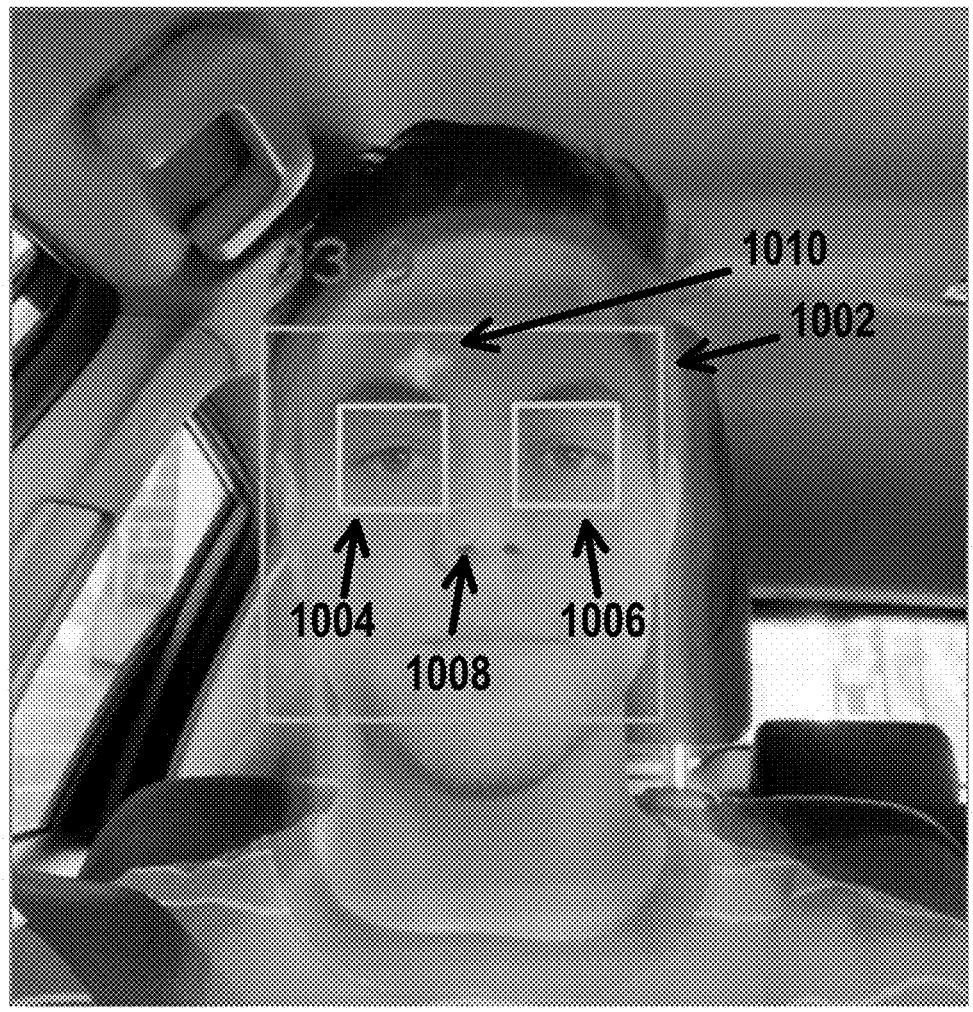
FIG. 10 illustrates an example dual image derived from a dual image output signal, in accordance with some embodiments of the present disclosure.

Labeled features 1002, 1004, 1006, 1008, and 1010 depicted in FIG. 10 show example depictions of added labelling of determined features added to the derived dual image (such as a derived dual image including optical and infrared image elements as well as labelled features derived from the hybrid image feature extraction circuit 508). Feature 1002 is shown within a square box, and represents a region of the dual image having a face of an identified person. Features 1004 and 1006 are shown within respective square boxes, and each feature represents a region of the dual image having an eye of an identified person. Feature 1008 is shown within a circle, and represents a region of the dual image that is the geometric center of the box, which can be used at the time to determine which direction the person is looking. Feature 1010 is shown as a plus symbol that represents a region of the dual image giving off a relatively high amount of heat relative to other portions of the identified person.

The onboard sub-processor 510 of the onboard processor 208 can be configured to further enhance the derivations of images, the determinations of features, and the labeling of features. For instance, the onboard sub-processor 510 can provide the arithmetic processing for the derivations of images, the determinations of features, and the labeling of features. Also, for example, the onboard sub-processor 510 can receive a first set of data from the individual image capture circuit 502, the hybrid image capture circuit 504, the individual image feature extraction circuit 506, and the hybrid image feature extraction circuit 508, and transform the first set of data to a second set of data based on further computer vision algorithms. In some examples, the computer vision algorithms executed by the onboard sub-processor 510 can fine-tune the images and image features derived and identified by the other circuits of the onboard processor 208.

The individual image capture circuit 512 of the host processor 402 can be configured to receive a processed optical image signal from the onboard processor 208, via the single output interface 214. The individual image capture circuit 512 can also be configured to receive a processed infrared image signal from the onboard processor 208, via the single output interface 214. The individual image capture circuit 512 can also be configured to further refine and/or process the processed optical image signal or the processed infrared image signal to derive an enhanced individual image. For example depictions of possible enhanced optical and infrared images, see FIGS. 8 and 9.

The hybrid image capture circuit 514 of the host processor 402 can be configured to receive an image signal representative of the processed dual image from the onboard processor 208, via the single output interface 214. The hybrid image capture circuit 514 can also be configured to further refine and/or process the received image signal representative of the dual image to derive an enhanced dual image. For an example depiction of a possible enhanced dual image, see FIG. 10.

The individual image heuristics extraction circuit 516 of the host processor 402 can be configured to determine additional or graphical features or enhanced or fine tune determined features from the optical image or the infrared image derived by the individual image capture circuit 502 and further processed by the individual image feature extraction circuit 506, based on an additional computer vision algorithm that includes a heuristic algorithm. The individual image heuristics extraction circuit 516 can also be configured to add further labeling to or enhance or refine the labeling of the optical image or the infrared image.

The hybrid image heuristics extraction circuit 518 of the host processor 402 can be configured to determine additional or graphical features or enhanced or fine tune determined features from the dual image derived by the hybrid image capture circuit 504 and further processed by the hybrid image feature extraction circuit 508, based on an additional computer vision algorithm that includes a heuristic algorithm. hybrid image heuristics extraction circuit 518 can also be configured to add further labeling to or enhance or refine the labeling of the dual image. Labeled features 1002, 1004, 1006, 1008, and 1010 depicted in FIG. 10 show example depictions of possible further labeling or enhance or refine labelling by the hybrid image heuristics extraction circuit 518 of the host processor 402.

The host sub-processor 520 of the host processor 402 can be configured to further enhance the derivations of images, the determinations of features, and the labeling of features for image information communicated from the onboard processor 208 via the single output interface 214 as well as similar information communicated from other circuits of the host processor 402. For instance, the host sub-processor 520 can provide additional arithmetic processing for the derivations of images, the determinations of features, and the labeling of features. Also, for example, the host sub-processor 520 can receive the transformed second set of data from the onboard processor 208, and transform the second set of data to a third set of data based on even further computer vision algorithms. In some examples, the computer vision algorithms executed by the host sub-processor 520 can even further fine-tune the images and image features derived and identified by the onboard processor 208 and other circuits of the host processor 402.

Figure 6:
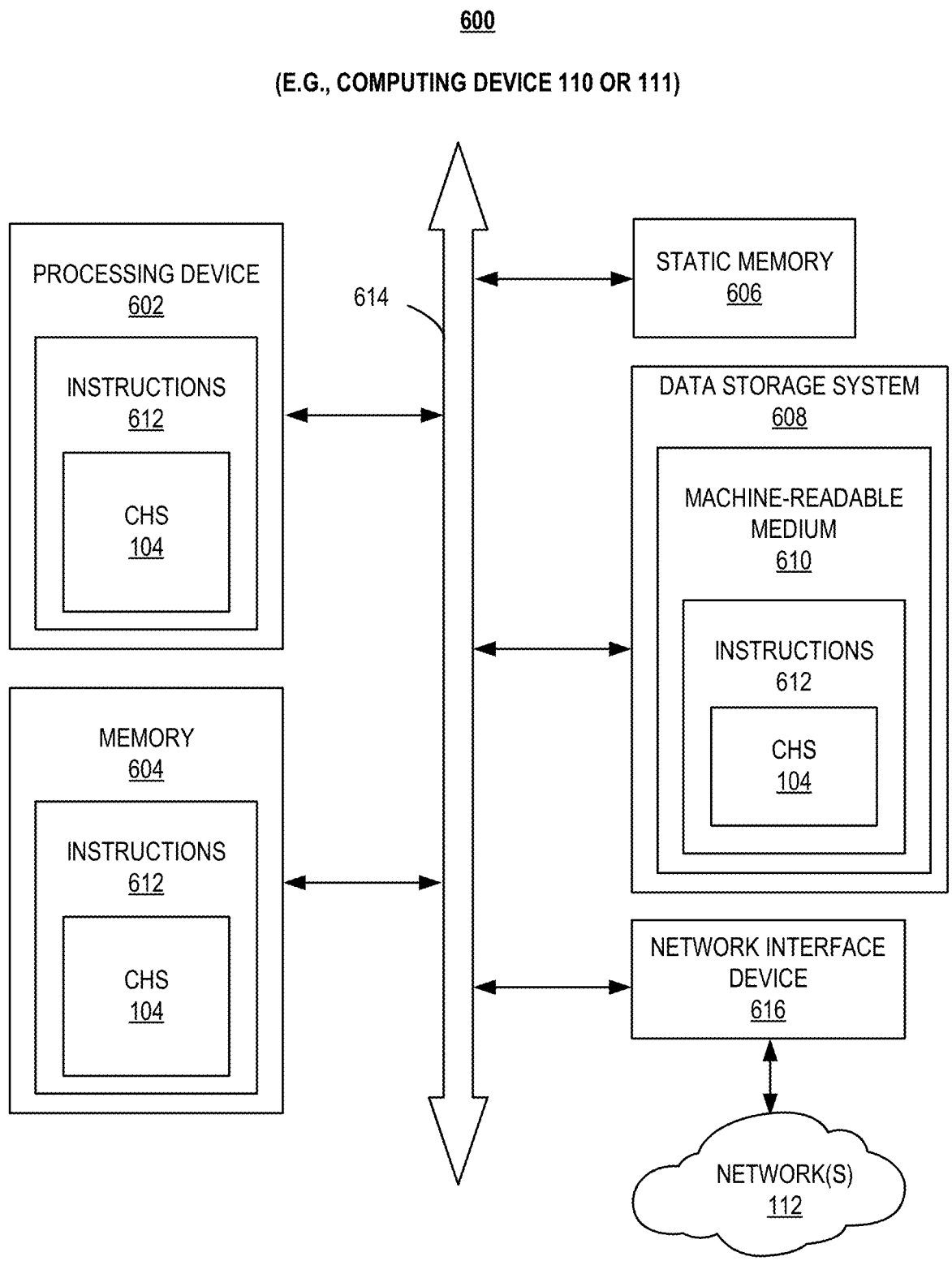
FIG. 6 is a block diagram of example aspects of a computer system, in accordance with some embodiments of the present disclosure.

FIG. 6 is a block diagram of example aspects of a computer system, in accordance with some embodiments of the present disclosure (e.g., see computing device 110 or 111). FIG. 6 illustrates parts of the computer system 600 within which a set of instructions, for causing a machine of the system to perform aspect(s) of any one or more of the methodologies discussed herein, can be executed. In some embodiments, the computer system 600 can correspond to a host system that includes, is coupled to, or utilizes memory or can be used to perform the operations of a controller (e.g., to execute an operating system to perform operations corresponding to the CHS 104 shown in FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine, such as an automated teller machine (ATM). Further, while a single machine is illustrated, the term "machine" shall also be taken to include any collection of machines that individually or jointly execute a set (or multiple sets) of instructions to perform aspect(s) of any one or more of the methodologies discussed herein.

The example computer system 600 includes a processing device 602, a main memory 604 (e.g., read-only memory (ROM), flash memory, dynamic random-access memory (DRAM), etc.), a static memory 606 (e.g., flash memory, static random-access memory (SRAM), etc.), and a data storage system 608, which communicate with each other via bus 614.

The processing device 602 represents one or more general-purpose processing devices such as a microprocessor, a central processing unit, or the like. More particularly, the processing device can be a microprocessor or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations discussed herein, such as operations associated with the CHS 104 shown in FIG. 1. The computer system 600 can further include a network interface device 616 to communicate over the LAN/WAN network(s) 112 of FIG. 1.

Also, not shown in FIG. 6, the computer system 600 can include an input/output interface, such as for receiving feedback from a feedback source external to system 600. The input/output interface can include a user interface to receive user input as feedback on computer vision data.

The data storage system 608 can include a machine-readable storage medium 610 (also known as a computer-readable medium) on which is stored one or more sets of instructions 612 or software embodying aspect(s) of any one or more of the methodologies or functions described herein, such as operations associated with the CHS 104 shown in FIG. 1. The instructions 612 can also reside, completely or at least partially, within the main memory 604 and/or within the processing device 602 during execution thereof by the computer system 600, the main memory 604 and the processing device 602 also constituting machine-readable storage media.

In one embodiment, the instructions 612 include instructions to implement functionality corresponding to the CHS 104 shown in FIG. 1. While the machine-readable storage medium 610 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform aspect(s) of any one or more of the methodologies of the present disclosure. The term "machine-readable storage medium" shall accordingly be taken to include, but not be limited to, solid-state memories, optical media, and magnetic media.

Figure 7:
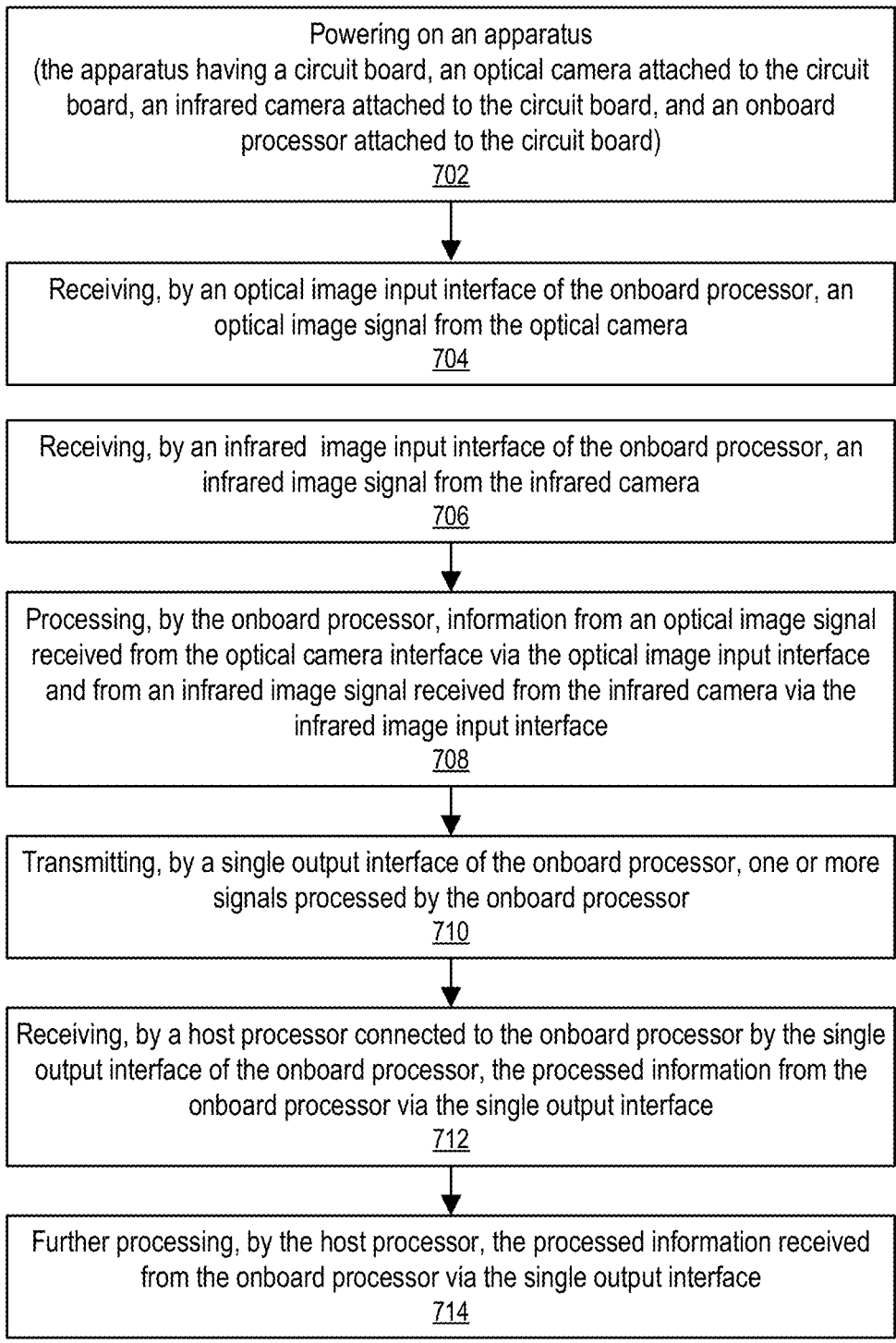
FIG. 7 is a flow diagram of an example method that utilizes a host device having a hybrid camera, in accordance with some embodiments of the present disclosure.

FIG. 7 is a flow diagram of an example method 700 that utilizes a host device having a hybrid camera (e.g., host device 200 or 400), in accordance with some embodiments of the present disclosure. The method 700 includes at least one operation that can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, aspects of the methods can be performed by one or more aspects of a host device having a hybrid camera (e.g., host device 102a, 102b, 102c, 200, or 400). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 702, the method 700 includes powering on an apparatus (such as a host device and/or a hybrid camera). The apparatus can include a circuit board (e.g., circuit board 202), an optical camera (e.g., optical camera 204) attached to the circuit board, an infrared camera (e.g., infrared camera 206) attached to the circuit board, and an onboard processor (e.g., onboard processor 208) attached to the circuit board.

In some embodiments, the infrared camera includes a thermal imaging sensor (TIS).

In some embodiments, the infrared camera includes an infrared radiation detection sensor comprising a plurality of micro-mirrors comprising light reflecting surfaces and infrared radiation sensing surfaces. And, in such embodiments, the infrared radiation detection sensor is configured to deflect light incident on the reflective surfaces as a function of intensity of infrared radiation sensed by the infrared radiation sensing surfaces.

At block 704, the method 700 includes receiving, by an optical image input interface of the onboard processor (e.g., optical image input interface 210), an optical image signal from the optical camera. In some embodiments, the optical image input interface includes a digital video port (DVP), a differential signaling interface, and/or a single-ended signaling interface.

At block 706, the method 700 includes receiving, by an infrared image input interface of the onboard processor (e.g., infrared image input interface 212), an infrared image signal from the infrared camera. In some embodiments, the infrared image input interface comprises a serial peripheral interface (SPI) or an inter-integrated circuit (I2C) interface.

At block 708, the method 700 includes processing, by the onboard processor, information from an optical image signal received from the optical camera interface via the optical image input interface and from an infrared image signal received from the infrared camera via the infrared image input interface. At block 708, the method 700 can also include providing, by the onboard processor, dual processed information in a single output signal based on the processed information. At block 708, the method can also include generating, by the onboard processor, a dual image output based on an optical image signal received from the optical camera interface via the optical image input interface and an infrared image signal received from the infrared camera via the infrared image input interface.

In some embodiments, the optical image signal includes a field of view of the optical camera and/or an optical axis of the optical camera. And, in some embodiments, the infrared image signal can include a field of view of the infrared camera and/or an optical axis of the infrared camera. Also, the fields of view and the optical axes of the cameras can be aligned with each other from the configuration and positioning of the cameras and/or by the onboard processor. The alignment of the optical and infrared images allows for a unique combined and blended image of optical and infrared which can be transmitted via a single output of the onboard processor.

At block 710, the method 700 includes transmitting, by a single output interface of the onboard processor (e.g., single output interface 214), one or more signals processed by the onboard processor. In some embodiments, the single output interface of the onboard processor includes a digital video port (DVP), a differential signaling interface, and/or a single-ended signaling interface, or a serial peripheral interface (SPI) or an inter-integrated circuit (I2C) interface.

At block 712, the method 700 includes receiving, by a host processor (e.g., host processor 402) connected to the onboard processor by the single output interface of the onboard processor, the processed information from the onboard processor via the single output interface.

At block 714, the method 700 includes further processing, by the host processor, the processed information received from the onboard processor via the single output interface. At block 714, the method 700 can also include providing, by the host processor, further dual processed information in an additional single output signal based on the further processed information. At block 714, the method can also include generating, by the host processor, a further dual image output based on the processed information received from the onboard processor.

In some embodiments, optical image information in the processed information received from the onboard processor includes a field of view of the optical camera and/or an optical axis of the optical camera. Also, the infrared image information in the processed information received from the onboard processor can include a field of view of the infrared camera and/or an optical axis of the infrared camera. And, the fields of view and the optical axes of the cameras can be aligned with each other from the configuration and positioning of the cameras, by the onboard processor and/or by the host processor. The alignment of the optical and infrared images allows for a unique combined and blended image of optical and infrared which can be transmitted via a respective single output of the onboard processor and/or the host processor.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   a circuit board;
   an optical camera having an optical image sensor attached to the circuit board, the optical image sensor capable of sensing only visible light, and configured to capture a first image of an object at a predetermined time;
   an infrared camera having an infrared image sensor attached to the circuit board, the infrared image sensor capable of sensing only infrared radiation, and configured to capture a second image of the object at the predetermined time;
   an optical image input interface configured to receive an optical image signal from the optical image sensor;
   an infrared image input interface configured to receive an infrared image signal from the infrared image sensor;
   an onboard processor attached to the circuit board, the onboard processor configured to:
      process information from the optical image signal received by the optical image input interface and from the infrared image signal received by the infrared image input interface to generate an optical image, an infrared image, and a hybrid image that includes an overlay of the optical image signal and the infrared image signal with the optical image signal and the infrared image signal reflecting a same element of the object placed on a same pixel location, wherein processing the information includes aligning one or more of a first field of view of the optical camera with a second field of view of the infrared camera or a first optical axis of the optical camera with a second optical axis of the infrared camera, and to extract a feature from the infrared image signal and add a label to the hybrid image indicating the feature; and a single output interface configured to selectively transmit the hybrid image, the optical image, or the infrared image by the onboard processor.

2. The apparatus of claim 1, wherein the onboard processor is communicatively coupled, by the single output interface, to a host processor of a host device comprising the apparatus, and wherein the single output interface is configured to transmit the hybrid image by the onboard processor to the host processor.

3. The apparatus of claim 1, wherein the onboard processor is communicatively coupled, by the single output interface, to a host processor of a host device comprising the apparatus, and wherein the single output interface is configured to transmit the hybrid image to the host processor.

4. The apparatus of claim 3, wherein the optical image signal comprises the first field of view of the optical camera, wherein the infrared image signal comprises the second field of view of the infrared camera, and wherein the first and second fields of view of the cameras overlap.

5. The apparatus of claim 1, wherein the optical image signal comprises the first field of view of the optical camera, wherein the infrared image signal comprises the second field of view of the infrared camera, and wherein the first and second fields of view of the cameras overlap.

6. The apparatus of claim 1, wherein the optical image input interface comprises a digital video port (DVP).

7. The apparatus of claim 1, wherein the optical image input interface comprises a differential signalling interface.

8. The apparatus of claim 1, wherein the optical image input interface comprises a single-ended signalling interface.

9. The apparatus of claim 1, wherein the infrared image input interface comprises a serial peripheral interface (SPI).

10. The apparatus of claim 1, wherein the infrared image input interface comprises an inter-integrated circuit (I2C).

11. The apparatus of claim 1, wherein the single output interface comprises a digital video port (DVP).

12. The apparatus of claim 1, wherein the single output interface comprises a differential signalling interface.

13. The apparatus of claim 1, wherein the single output interface comprises a single-ended signalling interface.

14. The apparatus of claim 1, wherein the single output interface comprises a serial peripheral interface (SPI).

15. The apparatus of claim 1, wherein the single output interface comprises an inter-integrated circuit (I2C).

16. The apparatus of claim 1, wherein the infrared camera comprises a thermal imaging sensor (TIS).

17. The apparatus of claim 1, wherein the infrared camera comprises an infrared radiation detection sensor comprising a plurality of micro-mirrors comprising light reflecting surfaces and infrared radiation sensing surfaces, and wherein the infrared radiation detection sensor is configured to deflect light incident on the reflective surfaces as a function of intensity of infrared radiation sensed by the infrared radiation sensing surfaces.

18. An apparatus, comprising:
a circuit board;
a CMOS optical image sensor attached to the circuit board, the CMOS optical image sensor capable of sensing only visible light, configured to capture a first image of an object at a predetermined time;
an infrared image sensor attached to the circuit board, the infrared image sensor capable of sensing only infrared radiation, configured to capture a second image of the object at the predetermined time;
an optical image input interface configured to receive an optical image signal from the CMOS optical image sensor;
an infrared image input interface configured to receive an infrared image signal from the infrared image sensor;
an onboard processor attached to the circuit board, the onboard processor configured to:
process information from the optical image signal received by the optical image input interface and from the infrared image signal received by the infrared image input interface to generate an optical image, an infrared image, and a hybrid image that includes an overlay of the optical image signal and the infrared image signal with the optical image signal and the infrared image signal reflecting a same element of the object placed on a same pixel location, wherein processing the information includes aligning one or more of a first field of view of the CMOS optical image sensor with a second field of view of the infrared image sensor or a first optical axis of the CMOS optical image sensor with a second optical axis of the infrared image sensor, and to extract a feature from the infrared image signal and add a label to the hybrid image indicating the feature; and a single output interface, configured to selectively transmit the hybrid image, the optical image, or the infrared image by the onboard processor.

19. A system, comprising:
a circuit board;
a CMOS optical image sensor attached to the circuit board, the CMOS optical image sensor capable of sensing only visible light, configured to capture a first image of an object at a predetermined time;
an infrared image sensor attached to the circuit board, the infrared image sensor capable of sensing only infrared radiation, configured to capture a second image of the object at the predetermined time;
an optical image input interface configured to receive an optical image signal from the CMOS optical image sensor;
an infrared image input interface configured to receive an infrared image signal from the infrared image sensor;
an onboard processor attached to the circuit board, the onboard processor configured to:
process information from the optical image signal received by the optical image input interface and from the infrared image signal received by the infrared image input interface to generate an optical image, an infrared image, and a hybrid image that includes an overlay of the optical image signal and the infrared image signal with the optical image signal and the infrared image signal reflecting a same element of the object placed on a same pixel location, wherein processing the information includes aligning one or more of a first field of view of the CMOS optical image sensor with a second field of view of the infrared image sensor or a first optical axis of the CMOS optical image sensor with a second optical axis of the infrared image sensor, and to extract a feature from the infrared image signal and add a label to the hybrid image indicating the feature;

a single output interface, configured to selectively transmit the information processed by the onboard processor; and a second processor communicatively coupled to the onboard processor by the single output interface, and configured to receive, via the single output interface, the hybrid image, the optical image, or the infrared image by the onboard processor.

* * * * *